United States Patent
Tissot

(10) Patent No.: US 7,692,146 B2
(45) Date of Patent: Apr. 6, 2010

(54) INFRARED RADIATION DETECTOR AND DRIVING OR PILOTING ASSISTANCE DEVICE COMPRISING SUCH A DEVICE

(75) Inventor: Jean-Luc Tissot, Saint Egreve (FR)

(73) Assignee: ULIS (FR)

(*) Notice: Subject to any disclaimer, the term of this patent is extended or adjusted under 35 U.S.C. 154(b) by 402 days.

(21) Appl. No.: 11/781,532

(22) Filed: Jul. 23, 2007

(65) Prior Publication Data
US 2008/0048119 A1  Feb. 28, 2008

(30) Foreign Application Priority Data
Aug. 14, 2006 (FR) ................... 06 53370

(51) Int. Cl.
*G01J 5/02* (2006.01)
(52) U.S. Cl. .............. 250/332; 250/330; 250/338.1
(58) Field of Classification Search ............. 250/330, 250/332, 338.1
See application file for complete search history.

(56) References Cited

U.S. PATENT DOCUMENTS 5,729,019 A * 3/1998 Krafthefer et al. .......... 250/353

FOREIGN PATENT DOCUMENTS

FR    2732849    10/1996

OTHER PUBLICATIONS

Wood R A: "Low-Cost Infrared Imagers" Scientific Honeyweller, Honeywell's Corporate. Minneapolis, US, 1996 pp. 109-116, XP000678076; ISSN: 0196-8440.

* cited by examiner

*Primary Examiner*—David P Porta
*Assistant Examiner*—Mark R Gaworecki
(74) *Attorney, Agent, or Firm*—Cantor Colburn LLP

(57) ABSTRACT

This detector comprises an assembly of elementary sensors capable of detecting said radiation. This assembly comprises at least two separate detection areas, a first detection area comprising elementary sensors having a first thermal time constant and a second detection area comprising elementary sensors having a second thermal time constant which is different to said first thermal time constant.

16 Claims, 2 Drawing Sheets

INFRARED RADIATION DETECTOR AND DRIVING OR PILOTING ASSISTANCE DEVICE COMPRISING SUCH A DEVICE

FIELD OF THE INVENTION

The present invention relates to an infrared radiation detector comprising an assembly of differentiated elementary sensors. The present invention also relates to a driving or piloting assistance device for land, air or sea vehicles comprising an infrared camera fitted with a detector in accordance with this invention.

The present invention therefore relates to the detection of infrared radiation, especially that emitted by objects present in the field of view of the driver or the pilot of such a vehicle.

For this application, it is already accepted that a thermal imaging device can provide essential information to help the driver of a vehicle detect obstacles or objects such as pedestrians, cyclists or vehicles in the case of a motor vehicle application, regardless whether the objects that are to be imaged are moving or stationary.

DESCRIPTION OF THE PRIOR ART

In order to assist the driving of vehicles, devices have been developed on an industrial scale for equipping motor vehicles with infrared cameras capable of detecting the objects mentioned above. These driving-assistance devices comprise infrared cameras equipped with non-cooled detectors for thermal infrared.

In fact, non-cooled detectors make it possible to produce focal planes having a cost and overall dimensions that are suitable for a high-volume commercial application such as motor vehicle equipment. In contrast, cooled infrared detectors are too costly and/or too bulky and/or insufficiently reliable to allow economical production of focal planes for onboard infrared cameras in mass-produced motor vehicles.

The vehicle driving-assistance devices proposed by the prior art comprise an infrared radiation detector which therefore operates without cooling and consists of an array of microbolometric sensors which all have the same thermal time constant. This thermal time constant is typically 5 ms to 30 ms. Thus, the microbolometric sensors which constitute an infrared radiation detector according to the prior art are all identical to each other in terms of both structure and performance.

In the context of dynamic imaging, the paramount performance parameters of microbolometric sensors are essentially their sensitivity to the infrared rays that are to be detected and the speed, i.e. response time, with which they convert the incident radiation. However, these two performance parameters, speed and sensitivity, are relatively antinomic. It is actually known that the more sensitive a bolometric sensor is, the slower it is, and vice versa. This obviously also applies to an infrared radiation detector which comprises an assembly of elementary microbolometric sensors.

Consequently, infrared detectors according to the prior art are designed to strike a compromise between these two performance parameters so as to produce relatively sharp images sufficiently quickly.

Nevertheless, this trade-off is not satisfactory for providing really effective driving assistance. In fact, even though the read frequency of the array of a microbolometric sensor is relatively high, one finds that movement of the vehicle produces an image motion effect on the images produced by the onboard infrared detector installed in the vehicle. The term "image motion effect" commonly denotes blurring or unsharpness of objects in an image.

It is observed that the "image motion effect" becomes more marked the further the emitting object is located from the line of sight of the detection field of the onboard infrared camera. Generally speaking, this line of sight is parallel to the forward direction of travel of the vehicle and coincides with the line of sight of the vehicle driver's field of view.

Consequently, objects located at the edges of the detection field of the infrared camera are more blurred than those located in the centre of the detection field, i.e. close to the line of sight of the camera. Moreover, the image motion effect becomes more marked as the speed of movement of the vehicle increases.

This image motion effect is mainly due to the inadequate speed of the elementary sensors which receive the incident rays, i.e. the sensors' excessively long response time. In fact, if the elementary sensors are too slow, the image of an object "spreads" over part of the focal plane because the time required for exposure becomes longer, the slower the elementary sensors are, to the extent that several adjacent sensors successively receive infrared rays emitted by a single point of the object.

The image unsharpness produced by the image motion effect is especially troublesome if the vehicle's driving-assistance device includes an automatic image processing system designed to identify and classify detected objects. In fact, if the image of the object is too blurred, this defeats such automatic image processing systems.

FIGS. 1 and 2 show the parameters involved in the image motion effect—formation of the equation for this effect is described below in order to quantify the image motion effect.

FIG. 1 shows vehicle 1 moving at speed V on road 2. Vehicle 1 is equipped with infrared camera 3 characterised by angle of view A. Angle of view A, which is actually a solid angle, therefore delimits the detection field of infrared camera 3.

An object O located on the edge of road 2 is located in this detection field, for example a pedestrian. The infrared rays emitted by this pedestrian towards infrared camera 3 form angle θ relative to line of sight 30 of infrared camera 3. More precisely and as shown in FIG. 2, angle θ is formed between the line of sight of infrared camera 3 and the direction in which optical centre C of lens 4 of infrared camera 3 sees object O. This angle θ represents the angle at which point O is viewed by infrared camera 3.

Given its position on the edge of road 2, object O is therefore located distance L from line of sight 30 of infrared camera 3 and distance D from the plane of lens 4.

Bearing in mind that the objects to be displayed are located at infinity, focal plane 5, comprising an array of elementary microbolometric sensors, is by definition located focal distance F from the plane of lens 4 of infrared camera 3.

Given that object O is stationary and that vehicle 1 moves at speed V in the ground reference frame, object O moves relative to infrared camera 3 at speed −V in a reference frame linked to vehicle 1. Moreover, if $x_i$ is the abscissa of image point I of point O on focal plane 5 of camera 3, it is readily apparent that point I moves on focal plane 5 at speed $V_i$ as a vehicle 1 moves forwards. Given the parameters of the movement shown in FIGS. 1 and 2, one can write the following (where δ is the derivation symbol):

$V_i = \delta X_i / \delta t$ (by definition); [I]

$X_i = L.F/D$ (according to Thales); [II]

Thus, if one inserts equation [II] into equation [I], this gives:

$V_i = \delta(L.F/D)/\delta t$, i.e. by derivation, $D$ only depending on time $t$: [III]

$V_i = -(L.F/D^2).\delta D/\delta t;$ [IV]

Since $V = \delta D/\delta t$ (by definition) and [V]

$\tan \theta = L/D$ (by definition), [VI]

by inserting equations [V] and [VI] in equation [IV], one can conclude that:

$V_i = (V.F/L).\tan^2 \theta.$ [VII]

Equation [VII] clearly shows that the image motion effect, i.e. image unsharpness, represented by travel speed $V_i$ increases as speed V increases or as angle $\theta$ increases, i.e. the closer object O is to the edges of detection field A of camera 3.

In other words, since the image motion effect is linked to the latency time or transit time of a point of the optical image across a pixel of the thermal imager having a dimension p, this transit time $T_t$ which equals $p/V_i$ therefore increases as angle $\theta$ or speed V increases.

The sharpness of an image is therefore greater, the shorter transit time $T_t$ is. Consequently, in order to assess the sharpness of an image produced by an infrared detector, one can compare transit time $T_t$ to the characteristic thermal time constant $\tau_{th}$ of an elementary sensor of that detector. Time constant $\tau_{th}$ is representative of the response time of the elementary sensor, i.e. the time needed to acquire the incident infrared ray. FIG. 3 shows an example of the variation in transit time $T_t$ as a function of angle $\theta$ for three different speeds V –50 km/h, 90 km/h and 130 km/h. The curves in FIG. 3 show that transit time $T_t$ rises sharply when angle $\theta$ is less than 15°.

These curves are given, by way of example, for an array of pixels each having a side dimension of 25 µm for objects O located distance L 5 m from the line of sight of infrared camera 3. Given the fact that the intensity of the signal detected by the detector is:

$S(t) = S_{inf}(1 - \exp(-t/\tau_{th}))$, where:

t is time and $S_{inf}$ is the signal obtained with infinite duration integration.

Thus, for example, if transit time $T_t$ equals $\tau_{th}$, the signal actually received only represents 63% of the signal which would be received by the same sensor and emitted by a stationary object. Given this 63% proportion, a transit time $T_t$ equalling thermal time constant $\tau_{th}$ is generally regarded as a minimum requirement in order to obtain adequate detection sensitivity.

For thermal infrared detectors having a time constant of 17 ms, a pixel pitch p of 25 µm and a thermal resolution (NetD or Noise Equivalent Temperature Difference) of 35 mK with a stationary object, unsharpness and loss of sensitivity become problematic with a viewing angle $\theta$ of 5° when the vehicle is moving at 130 km/h.

In practice, because angle $\theta$ is very small, most of the objects represented in the image are unsharp or even very unsharp. Consequently, the driving assistance provided by devices according to the prior art is inadequate and even disruptive and this makes the onboard infrared detector ineffective.

The objective of the present invention is therefore to provide an infrared radiation detector which is unaffected by excessive image motion effect at the edges of the field of view whilst offering sufficient sensitivity to enable automatic identification of encountered objects.

THE INVENTION

The present invention relates to an infrared radiation detector allowing rapid detection at the edges of the field of view and sensitive detection in the centre of this field of view.

The present invention relates to an infrared radiation detector comprising an assembly of elementary sensors capable of detecting this radiation. According to the invention, this assembly comprises at least two separate detection areas, a first detection area comprising elementary sensors having a first thermal time constant and a second detection area comprising elementary sensors having a second thermal time constant which is different to the first thermal time constant.

In other words, the infrared radiation detector comprises at least one set of "high-speed" elementary sensors and at least one set of "sensitive" elementary sensors. Thus, the detector which is the subject of the invention can produce a relatively sharp image regardless of the position of the object in its detection field whilst nevertheless being very sensitive.

In practice, the first detection area occupies the centre of this assembly whereas the second detection area occupies the periphery of the assembly, the second detection area comprising elementary sensors having a thermal time constant which is lower than that of the elementary sensors which constitute the first detection area.

This positioning of the two separate detection areas makes it possible, in a motor vehicle application, to limit the unsharpness produced by objects located at the edge of the detection field whilst producing a very sharp image of objects situated far from the vehicle and hence in the centre of the detection field.

According to one practical embodiment of the invention, the assembly of elementary sensors may be in the shape of a rectangular array.

Thus, the image of the detection field can be represented on a rectangular screen, a format which every driver is used to.

According to one embodiment of the invention, the detector may comprise five separate detection areas juxtaposed two by two, namely a central area, a left-hand peripheral area, a right-hand peripheral area, an upper peripheral area and a lower peripheral area.

Such a detector allows differentiated processing of the various central and peripheral parts of the driver's field of view in accordance with the priorities assigned to them.

According to one particular implementation of this embodiment of the invention, this central area can be rectangular whereas the four peripheral areas can have a regular trapezoid shape, the sides of the trapezoids being determined by the diagonals of the rectangular array which defines the assembly of elementary sensors.

The term "regular trapezoid" is taken to mean a trapezoid having oblique sides of equal length. Such rectangular or trapezoidal shapes make it possible to produce an image with a "natural" perspective, i.e. isometric perspective with a vanishing point in the centre of the detection field.

In one particular embodiment of the invention, the elementary sensors can be bolometric sensors that are each thermally, mechanically and electrically connected by at least one arm to a substrate which is common to the assembly of elementary sensors.

Such sensors have thermal time constants which make it possible to produce images of objects which emit thermal infrared rays sufficiently quickly and sensitively.

According to one implementation of this particular embodiment of the invention, the thermal resistances of the bolometric sensors which constitute the separate detection areas can be respectively different.

Differentiating the thermal resistances of the elementary sensors belonging to the separate areas in this way makes it possible to obtain different thermal time constants so that the areas that constitute the assembly of sensors forming the infrared detector can be processed differently.

In practice, the lengths of the arms of the bolometric sensors which constitute the separate detection areas can be respectively different.

Alternatively, the widths of the arms of the bolometric sensors which constitute the separate detection areas can be respectively different.

Alternatively, the thicknesses of the arms of the bolometric sensors which constitute the separate detection areas can be respectively different.

This differentiation in the geometrical characteristics of the arms of the various elementary sensors makes it possible to create separate areas in the assembly of elementary sensors.

According to another implementation of this particular embodiment of the invention, the calorific capacities of the bolometric sensors which constitute the separate detection areas can be respectively different.

This differentiation in the calorific capacities of the elementary sensors makes it possible to create separate areas (in terms of their speed and sensitivity) in the assembly of sensors which constitute the infrared detector.

In practice, the thicknesses of the bolometric sensors which constitute the separate detection areas can be respectively different.

In practice, the materials of which the bolometric sensors which constitute the separate detection areas are made can be respectively different.

In practice, the surface area of the sensitive areas of the bolometric sensors which constitute the separate detection areas can be respectively different.

This arrangement has the advantage, from the point of view of the method of producing the sensors, of using the same material(s) and the same thickness or thicknesses at every point of the detection area. The surface area of the sensitive areas can be modified by adjusting their lateral dimensions or by leaving openings, by hole punching or cutting, in these sensitive areas.

Differentiating one of these parameters (thickness, material, surface area) makes it possible to define elementary sensors having different performance and, consequently, to create separate detection areas.

According to one practical embodiment, thermal time constants can vary from 5 ms to 30 ms.

Such thermal time constants are compatible with the real-time imaging requirements demanded by certain infrared detection applications, especially in the motor vehicle field.

In practice, this rectangular array may have a pitch of 15 μm to 51 μm. Such a pitch is compatible with the image definition required in certain applications, especially driving assistance.

Also, the present invention relates to a vehicle driving-assistance device. According to the invention, it comprises an infrared camera equipped with a detector as explained above, the camera being electrically connected to a luminescent display device capable of reproducing the scene observed by this detector.

Such a device therefore makes it possible to display the scene observed by the detector and seen by the driver by displaying objects with satisfactory sharpness in the centre and at the edges of the detection field, whilst enabling the driver to monitor the movement of lateral objects in real-time.

BRIEF DESCRIPTION OF THE DRAWINGS

The way in which the invention can be implemented and the resulting advantages will become apparent from the following description of an example embodiment, given merely by way of example, reference being made to the accompanying drawings in which.

DESCRIPTION OF THE PREFERRED EMBODIMENTS

Figure 4A:
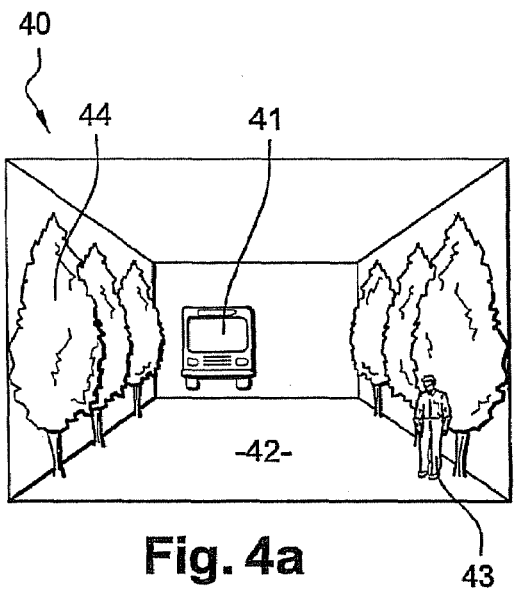
FIG. 4a is a schematic view of a driving scene as seen as seen by a driver.

FIG. 4a therefore illustrates a typical driving scene as observed by a vehicle driver in his or her field of view 40. This scene comprises trees 44, a vehicle 41, a pedestrian 43 and the road 42 on which the driver's vehicle is travelling. Bus 41, necessarily located on road 42, is relatively far away from the driver. Bus 41 therefore appears in central area 45 of field of view 40 of the driver or of the detection field of the onboard infrared camera. In contrast, pedestrian 43 is located on the edge of the carriageway close to the vehicle. Pedestrian 43 therefore appears in lateral area 46 close to the right-hand edge of field of view 40. Trees 44 are distributed along the edge of the carriageway 42 and therefore appear in lateral areas 46 and 47 of field of view 40. Trees 44 are more or less distant from the vehicle, i.e. their location is distributed in lateral areas 46 and 47 from the lateral edges of field of view 40 as far as central area 45.

Figure 1:
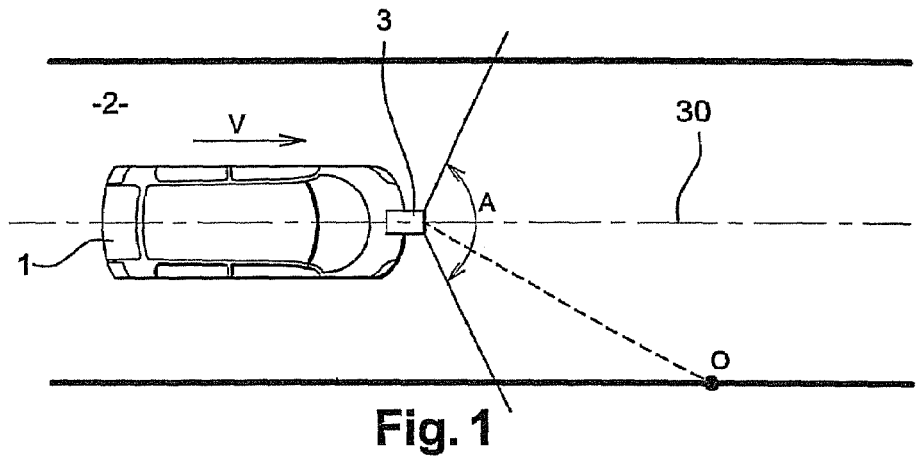
FIG. 1 is a schematic top view of a vehicle equipped with an infrared camera. This Figure has already been described in relation to the prior state of the art.
Figure 2:
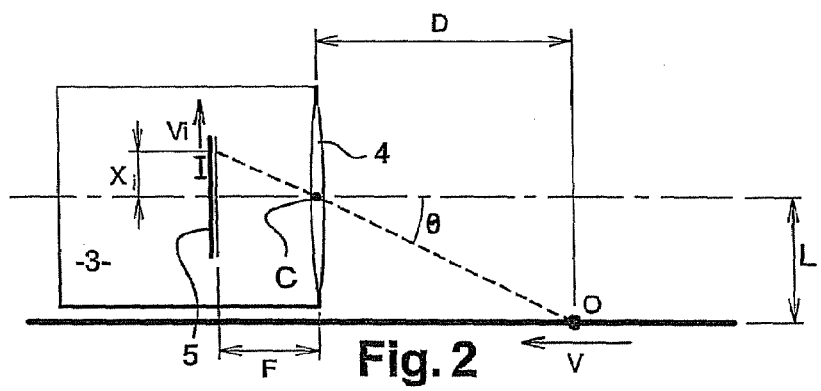
FIG. 2 is a schematic cross-sectional view of an infrared camera. This Figure has already been described in relation to the prior state of the art.
Figure 3:
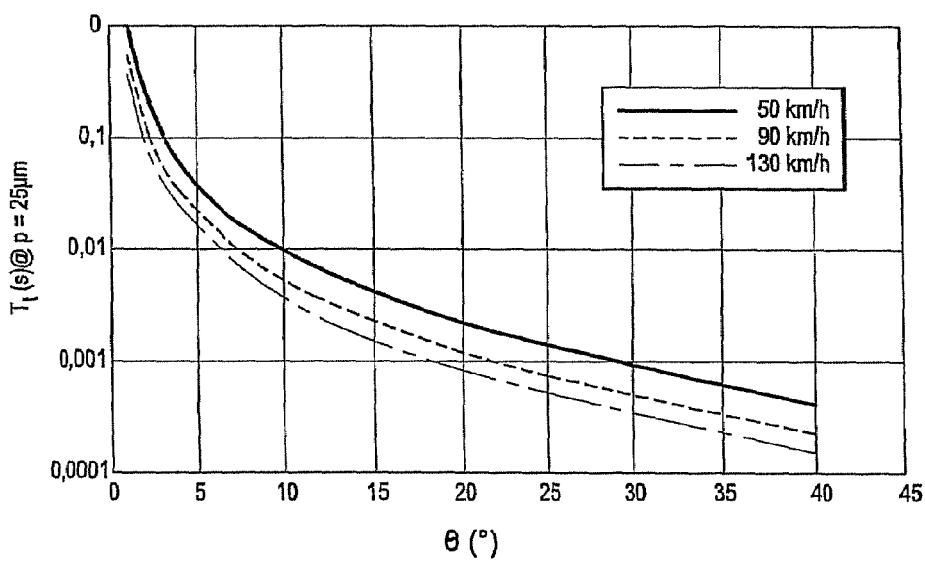
FIG. 3 shows a diagram illustrating variation in the transit time across one elementary sensor as a function of the angle of view and the speed of the vehicle. This Figure has already been described in relation to the prior state of the art.

As explained in relation to FIGS. 1 and 2 described above, objects located in the central area of the driver's field of view 40, such as bus 41, move at relatively low speed in field of view 40, whereas objects located in lateral areas 46 and 47 close to the left-hand and right-hand edges of field of view 40, such as pedestrian 43, move at relatively high speed in field of view 40.

Figure 4B:
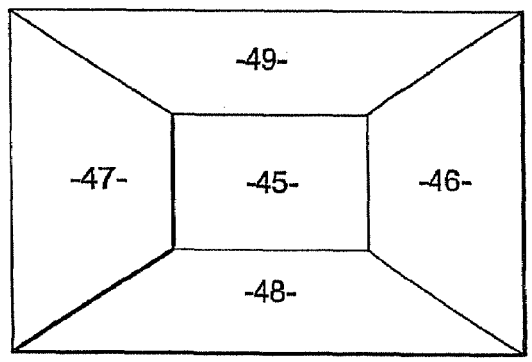
FIG. 4b is a schematic view showing one aspect of the detector which is the subject of the present invention.

According to the invention, the infrared radiation detector shown schematically in FIG. 4b comprises an assembly of elementary bolometric sensors comprising five separate detection areas 45-49 which are juxtaposed two by two. For these five areas, a distinction is made between central area 45, left-hand peripheral area 47 and right-hand peripheral area 46, as well as upper peripheral area 49 and lower peripheral area 48.

In accordance with one embodiment of the invention, the assembly of elementary bolometric sensors which form the infrared radiation detector has a rectangular array shape. In fact, drivers are used to information being displayed in a rectangular box because this format is widely adopted in the field of display screen equipment. In addition, building a rectangular array is relatively simple and therefore economical.

Moreover, central area 45 of the detector according to the invention has a rectangular shape whereas the four peripheral areas have a trapezoid shape, the sides of the trapezoids being determined by the diagonals of the rectangular array of the detector. This specific way of splitting up detection areas 45-49 makes it possible to define sectors which match the natural vision of the driver, i.e. vision with an isometric perspective with the vanishing point in the centre of the field of view. Thus, the image output by the infrared detector is reconstructed and understood by the driver naturally and this enables the driver to react as quickly as possible. Splitting up the infrared detector into sectors 45-49 therefore provides especially effective vehicle driving assistance.

According to the invention, separate detection areas 45-49 comprise elementary sensors, in this case bolometric sensors, which have different thermal time constants depending on the particular detection area to which they belong. Thus, an elementary sensor in central area 45 has a thermal time constant which is different to that of an elementary sensor which belongs to left-hand peripheral area 47.

In practice, the characteristic thermal time constant of the elementary bolometric sensors in central area 45 exceeds the thermal time constant in lateral peripheral areas 45, 46 and 47. This way, objects located in central area 45 of field of view 40, like bus 41, are detected by elementary sensors which are highly sensitive but relatively slow. Nevertheless, because the speed at which bus 41 moves in field of view 40 is slow, the image of the bus produced by the infrared detector is sufficiently sharp to enable it to be identified by the driver or by an automatic image processing system.

As far as objects located in the lateral areas are concerned, especially left-hand area 47 and right-hand area 46, close to the left and right edges of field of view 40, these are detected by elementary sensors which are fast but relatively insensitive, yet sensitive enough because the objects are closer to the vehicle. These objects, such as pedestrian 43 or the first trees 44, are thus detected with low thermal time constants and hence with short latency times or transit times which makes it possible to significantly reduce or even eliminate unsharpness caused by the image motion effect which affects detectors according to the prior art. Thus, despite the high speed at which pedestrian 43 moves relative to the vehicle, the image is displayed sufficiently sharply and quickly to enable the driver of the vehicle to locate and monitor these movements. This produces an image that is largely free from the motion image effect.

The infrared radiation detector according to the invention can therefore advantageously be fitted in a built-in infrared camera in an onboard driving-assistance device of a vehicle which provides especially effective driving assistance, given the high speed at which lateral objects 44 and 43 are imaged and the sensitivity with which central objects 41 are imaged.

Moreover, upper peripheral area 49 and lower peripheral area 48 are equipped with bolometric elementary sensors similar to those that make up lateral areas 46 and 47. Preference is thus given to speed of image acquisition for detection areas 48 and 49.

Nevertheless and as needed, it is possible to envisage equipping upper peripheral area 49 and lower peripheral area 48 with elementary sensors having a thermal time constant that is different to the thermal time constant which characterises the elementary sensors of lateral areas 46 and 47 and central area 45. Similarly, it is possible to envisage equipping peripheral areas 48 and 49 with elementary sensors having thermal time constants that are different, just as one can equip lateral areas 46 and 47 with separate elementary sensors. This makes it possible, for example, to acquire images especially quickly for lateral area 46 which is the closest to the vehicle in countries where one drives on the right, and equip lateral area 47 with elementary sensors of intermediate sensitivity.

Figure 5A:
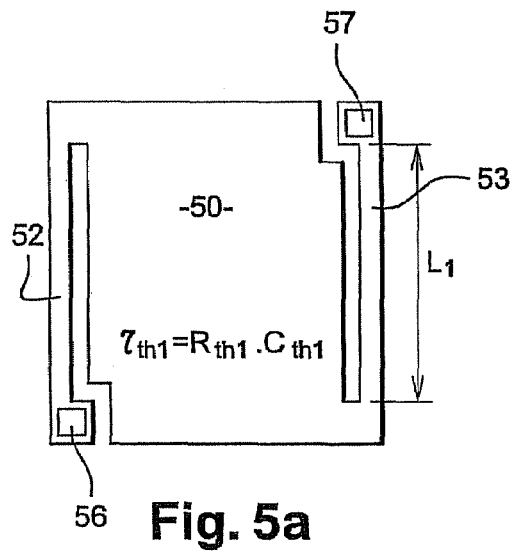
FIG. 5a is a schematic cross-sectional view of a first type of microbolometric elementary sensor capable of being fitted in a detector in accordance with the invention.
Figure 5B:
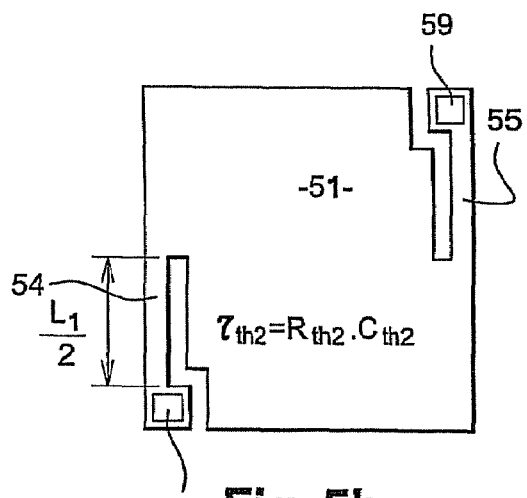
FIG. 5b is a schematic cross-sectional view of a second type of microbolometric elementary sensor capable of being fitted in a detector in accordance with the invention.

In practice, the elementary sensors which make up the infrared radiation detector are non-cooled microbolometric sensors, i.e. they operate at ambient temperature. Such sensors actually offer appropriate performance in terms of sensitivity and speed for real-time imaging of a scene observed by a vehicle driver and, above all, the cost and overall dimensions of the sensors are appropriate for motor vehicle applications. FIGS. 5a and 5b show such bolometric sensors capable of equipping the various detection areas of the detector which is the subject of the invention.

Each of bolometric sensors 50, 51 which form the infrared detector is thermally, mechanically and electrically connected by at least one arm 52-55 to a common substrate via contacts 56-59. For these sensors, because thermal time constant $\tau_{th}$ is the product of the thermal resistance $R_{th}$ and the calorific capacity $C_{th}$ of a bolometric elementary sensor, the present invention proposes varying one and/or the other of these two parameters in order to define the elementary sensors used to equip the separate detection areas.

Thus, in accordance with the embodiment shown in FIGS. 5a and 5b, one can vary the thermal resistance of the bolometric sensors by altering the lengths of arms 52-55 which support bolometric sensors 50, 51 so as to define two types of elementary sensors having two different thermal time constants.

This is why the length of arms 52 and 53 of first sensor 50 is $L_1$, whereas the length of arms 54 and 55 of second sensor 51 is $L_1/2$, i.e. half the length of the arms of the first sensor. Consequently, thermal resistance $R_{th2}$ of second sensor 51 is half the thermal resistance $R_{th1}$ of first sensor 50, because the thermal resistance of a bolometric sensor is proportional to the length of its support arms.

First sensor 50 is therefore more sensitive but not as fast as second sensor 51. One can therefore build central area 45 of the infrared detector using sensors of the first type 50 and build peripheral areas 46-49 using elementary sensors of the second type 51. This produces a detector with a sensitive central area 45 and fast peripheral areas 46-49 in order to acquire images of objects located in the driver's field of view 40.

The thermal resistance of an elementary sensor also depends on the width and thickness of the support arms to the extent that it is also possible to envisage varying the width or thickness of the support arms in order to define bolometric sensors having different thermal time constants.

Similarly, it is possible to vary the calorific capacities of bolometric sensors in order to form separate detection areas by altering, for instance, the thickness or the nature of the materials of which they are made.

Similarly, it is also possible to vary the calorific capacities of bolometric sensors in order to form separate detection areas by altering the surface area of the sensitive detection area. One can, for example, cut openings or punch holes in the sensor in order to reduce this surface area.

It is desirable for the thermal time constants of these bolometric sensors to range from 5 ms to 30 ms in order to produce images in real time which provide effective driving assistance. Advantageously, the bolometric sensors which constitute central detection area 45 can have a thermal time constant of 30 ms, whereas the bolometric sensors which constitute peripheral areas 46-49 can have a thermal time constant of 5 ms.

Besides this and in the context of the example described in relation to the Figures, the bolometric sensors which constitute the assembly that forms the rectangular array of the infrared detector have a pitch of 25 μm which makes it possible to produce images with a sufficiently fine resolution to provide the driver with effective driving assistance.

Other embodiments of the invention are possible without extending beyond the scope of the invention. One could, for example, replace the bolometric sensors by pyroelectric or ferroelectric sensors.

The invention claimed is:

1. An infrared radiation detector comprising an assembly of elementary sensors capable of detecting said radiation, wherein said assembly comprises at least two separate detection areas:
   a first detection area comprising elementary sensors having a first thermal time constant $\tau_{th1}$ and which occupy the centre of said assembly,
   and a second detection area comprising elementary sensors having a second thermal time constant $\tau_{th2}$ which is less than said first thermal time constant $\tau_{th1}$ and which occupy the periphery of said assembly.

2. An infrared radiation detector as claimed in claim 1, wherein said assembly has a rectangular array shape.

3. An infrared radiation detector as claimed in claim 2, wherein it comprises five separate detection areas juxtaposed two by two, namely a central area, a left-hand peripheral area, a right-hand peripheral area, an upper peripheral area and a lower peripheral area.

4. An infrared radiation detector as claimed in claim 3, wherein said central area has a rectangular shape whereas the four peripheral areas have a regular trapezoid shape, the sides of the trapezoids being determined by the diagonals of said rectangular array.

5. An infrared radiation detector as claimed in claim 2, wherein the rectangular array has a pitch of 15 μm to 51 μm.

6. An infrared radiation detector as claimed in claim 1, wherein the elementary sensors are bolometric sensors, each thermally, mechanically and electrically connected by at least one arm to a substrate which is common to said assembly.

7. An infrared radiation detector as claimed in claim 6, wherein the thermal resistances ($R_{th1}$, $R_{th2}$) of the bolometric sensors which constitute the separate detection areas are respectively different.

8. An infrared radiation detector as claimed in claim 7, wherein the lengths of arms of bolometric sensors which constitute the separate detection areas are respectively different.

9. An infrared radiation detector as claimed in claim 7, wherein the widths of arms of bolometric sensors which constitute the separate detection areas are respectively different.

10. An infrared radiation detector as claimed in claim 7, wherein the thicknesses of bolometric sensors which constitute the separate detection areas are respectively different.

11. An infrared radiation detector as claimed in claim 6, wherein the calorific capacities ($C_{th1}$, $C_{th2}$) of bolometric sensors which constitute the separate detection areas are respectively different.

12. An infrared radiation detector as claimed in claim 11, wherein the thicknesses of bolometric sensors which constitute the separate detection areas are respectively different.

13. An infrared radiation detector as claimed in claim 12, wherein the materials of which bolometric sensors which constitute the separate detection areas are made are respectively different.

14. An infrared radiation detector as claimed in claim 11, wherein the surface areas of bolometric sensors which constitute the separate detection areas are respectively different.

15. An infrared radiation detector as claimed in claim 1, wherein said thermal time constants ($\tau_{th1}$, $\tau_{th2}$) range from 5 ms to 30 ins.

16. A vehicle driving-assistance device, wherein it comprises an infrared camera equipped with a detector as claimed in claim 1 and being electrically connected to a display capable of reproducing the scene observed by said detector.

* * * * *